United States Patent

[11] 3,573,438

[72] Inventor John H. Rowen
Florham Park, N.J.
[21] Appl. No. 654,429
[22] Filed July 19, 1967
[45] Patented Apr. 6, 1971
[73] Assignee Bell Telephone Laboratories, Incorporated
Murray Hill, N.J.

[54] THERMALLY CONTROLLED OPTOELECTRONIC DISPLAY DEVICE
2 Claims, 7 Drawing Figs.

[52] U.S. Cl. ........ 235/92, 340/173, 307/221, 307/310
[51] Int. Cl. ........ H03k 23/02
[50] Field of Search ........ 307/221, 310; 219/507; 338/25, 22, 23, 24; 235/92; 340/173 (LSS)

[56] References Cited
UNITED STATES PATENTS

| | | | |
|---|---|---|---|
| 2,907,001 | 9/1959 | Loebner | 340/173 |
| 3,461,316 | 8/1969 | Acton | 307/41 |
| 3,020,410 | 2/1962 | Bowerman | 250/208 |
| 3,132,325 | 5/1964 | Bray | 340/173 |
| 3,483,140 | 12/1969 | Graf | 252/518 |
| 3,402,131 | 9/1968 | Futaki | 252/512 |

*Primary Examiner*—Thomas A. Robinson
*Assistant Examiner*—Robert F. Gnuse
*Attorneys*—R. J. Guenther and Arthur J. Torsiglieri

ABSTRACT: A shift register includes a plurality of modules connected in parallel, each of the modules comprising a variable resistivity element disposed adjacent to a heating resistor. In order that a pulse propagate from one module to the next, the heating resistor of each module is made responsive to the state of the variable resistivity element of the next preceding module. The shift register has application as a scanner for optoelectronic display panels.

Patented April 6, 1971 3,573,438

3 Sheets-Sheet 1

INVENTOR
J. H. ROWEN
BY David P. Kelley
ATTORNEY

THERMALLY CONTROLLED OPTOELECTRONIC DISPLAY DEVICE

BACKGROUND OF THE INVENTION

This invention relates to shift registers utilizing variable resistivity materials, and more particularly to shift registers used as scanners for optoelectronic display panels.

With the advent of optoelectronic solid state display panels as a means of visually displaying information, it has become desirable to devise means for scanning the display panel. The display panel generally includes an array or matrix of optoelectronic elements which form the crosspoints of the matrix. The function of a scanner, which is basically a shift register, is to address selectively the optoelectronic elements in such a manner as to convey information.

Access to a crosspoint is typically accomplished by connecting a horizontal and a vertical control lead to each optoelectronic element. All of the horizontal control leads are connected to one shift register and all vertical leads to another. Thus, each crosspoint in the array is addressed by pulsing, through the shift registers, an appropriate pair of control leads.

Various complex shift registers and switching circuits have been devised in the art to perform the basic scanning function. Advanced designs utilize a series of field effect transistor gate circuits; some even require transformers to couple to each optoelectronic element.

For simplicity, size and cost considerations, it is desirable that the shift register be fabricated in integrated circuit form. To this end it is also desirable that both the optoelectronic display panel and its associated shift registers be formed on the same substrate. Although prior art transistorized designs can be manufactured in integrated circuit form, the necessity of fabricating semiconductor junctions increases cost by reducing percent yield. Of course, those designs employing transformers cannot be manufactured as integrated circuits at all.

Another problem associated with prior art scanning systems utilizing only a horizontal and vertical shift register concerns the faulty operation of an optoelectronic crosspoint. It is customary in the art to connect in series with each optoelectronic element a highly nonlinear element for the switching purposes. A selected crosspoint is pulsed with a modulation voltage thereby switching the nonlinear element and activating the optoelectronic crosspoint. Only the selected crosspoint should close. Yet other crosspoints, which should remain open, frequently undergo faulty closure. Such faulty operation arises because the crosspoints in prior art devices are electrically coupled. Consequently, a fraction of the modulation voltage which appears across them may be sufficient to switch their associated nonlinear elements. The basic problem, then, is that the state of the crosspoint is dependent on the modulating voltage. An associated problem is that capacitive coupling between the crosspoints also can give rise to faulty operation.

SUMMARY OF THE INVENTION

The shift register of the invention in one illustrative embodiment comprises a plurality of shift modules connected in parallel, each shift module typically comprising a thin film of variable resistivity material disposed adjacent to heating resistor. Each thin film is characterized by a high and a low resistivity state determined by the temperature of the thin film. The heating resistor of each module is made responsive to the state of the thin film of the next preceding shift module by being electrically connected, for example, in series with that thin film. Other connections are possible as well. A shift module is triggered by applying a heat pulse to its associated variable resistivity thin film thereby switching the thin film to its low resistivity state, and, in turn, heating its series connected resistor. That resistor heats the next succeeding variable resistivity thin film, and so on. In this manner the initial trigger pulse is made to propagate from one shift module to the next.

The variable resistivity materials employed in the present invention are a particular class of thermoresistive materials in which it has been found that resistivity is highly sensitive to the temperature of the material. Such materials are characterized by a metal-semiconductor phase transition. That is, there is some transition temperature below which the material is a semiconductor and above which it is metallic. At this transition temperature, the resistivity of material decreases abruptly. The temperature of the material is raised to the transition temperature by application thereto of heat energy supplied in the present invention by current flow in the heating resistor. Thermoresistive materials include, for example, vanadium monoxide, vanadium dioxide and vanadium sesquioxide which have respective transition temperatures of approximately $-148°$ C., $68°$ C. and $-95°$ C.

The shift register may be utilized as a scanner for an optoelectronic display panel by thermally (not electrically) coupling each shift module to a separate optoelectronic module comprising a variable resistivity thin film switch connected in series with an optoelectronic element, typically an electroluminescent diode. A modulating voltage is impressed across each optoelectronic module.

As a heat pulse propagates from one shift module to the next, the variable resistivity thin film of each optoelectronic module switches sequentially to its low resistivity state. Correspondingly, the current to each diode increases causing it to luminesce. In this manner, the shift register scans the display.

The basic simplicity of the invention allows it to be readily fabricated in integrated circuit form by well-known thin film sputtering or evaporation techniques. In fact, it is feasible to utilize a separate scanner disposed along each horizontal (or vertical) row of crosspoints. Such an arrangement advantageously reduces capacitive coupling inherent between the control leads of a matrix, a problem discussed previously with respect to prior art devices utilizing only a single vertical and a single horizontal scanner.

Furthermore, faulty operation of the optoelectronic crosspoints is greatly reduced in the present invention because the state of each crosspoint is not dependent on the modulating voltage. Rather, each shift module is preferably thermally, not electrically, coupled through a separate thermoresistive switch to each optoelectronic element. In addition, because of the high ratio of OFF to ON impedance of the thermoresistive switch, very little current flows in the associated optoelectronic element when the switch is OFF. Consequently, only the presence of the requisite heat pulse (not some fraction of modulating voltage as in prior art devices) can close the thermoresistive switch and activate the associated optoelectronic element.

BRIEF DESCRIPTION OF THE DRAWINGS

The invention, together with its various features and advantages, can be easily understood in the following more detailed description taken in conjunction with the following drawings, in which.

DETAILED DESCRIPTION

Figure 1:
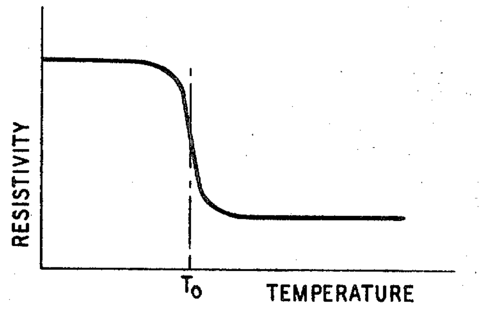
FIG. 1 is a graph of resistivity versus temperature for a thermoresistive material.

There is shown in FIG. 1 a typical graph of resistivity versus temperature for a thermoresistive material. The transition temperature $T_o$ at which the resistivity decreases abruptly is indicated by the broken line. Although it is not shown, the resistivity curve exhibits a slight hysteresis in the vicinity of the transition temperature.

SHIFT REGISTER - FREE RUNNING

Figure 2:
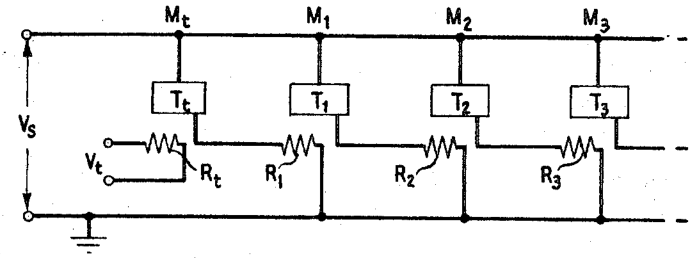
FIG. 2 is a schematic of a shift register in accordance with one embodiment of the invention.

A shift register embodying thermoresistive elements is shown in FIG. 2. The shift register comprises a plurality of shift modules $M_1$, $M_2$ ... connected in parallel, each of the modules comprising, respectively, a thermoresistive element $T_1$, $T_2$ ... disposed adjacent to a heating resistor $R_1$, $R_2$ ... Each of the heating resistors is connected in series with the thermoresistive element of the next preceding module. The first module $M_t$ in the array is a trigger module comprising the thermoresistive element $T_t$ disposed adjacent to the heating resistor $R_t$ which is connected to a trigger voltage source $V_t$.

In operation an excitation voltage $V_s$ is impressed across each of the shift modules causing current to flow therein. This current, with each of the thermoresistive elements initially in its high resistivity state, is much too small to raise the temperature of any module above its transition temperature. Upon the application of a trigger pulse, however, current flow in the resistor $R_t$ produces heat which raises the temperature of the thermoresistive element $T_t$ above its transition temperature causing an abrupt decrease in its resistivity. Consequently, there is an abrupt increase in current flow in the resistor $R_1$ of module $M_1$. The heat generated in resistor $R_1$ raises the temperature of thermoresistive element $T_1$ above its transition temperature causing an abrupt decrease in its resistivity which in turn produces an abrupt increase in current flow in resistor $R_2$ of shift module $M_2$, and so on. In this manner the initial trigger pulse is made to propagate from one shift module to the next. The pulse propagates to the last shift module even though the initial trigger pulse in the meantime is removed; that is, the shift register is "free running."

The frequency or rate of propagation of the pulse from one module to the next is dependent on both the excitation voltage $V_s$ and the thermal time constant associated with each shift module. The excitation voltage $V_s$ may be either DC or a train of pulses. In the latter case the pulse repetition rate of the pulse train is made to be approximately the reciprocal of the thermal time constant, typically about 0.2 $\mu$sec. The use of pulsed excitation serves to lock the propagation rate of the scanner to the pulse repetition rate thereby making the propagation rate more responsive to external control. Such control is useful where each of the modules have similar, but not necessarily identical, characteristics.

A SCANNER FOR OPTOELECTRONIC DISPLAYS

Figure 3:
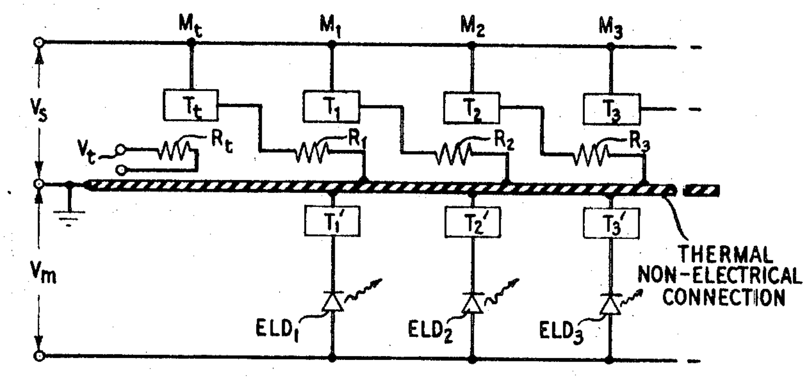
FIG. 3 is a schematic of a shift register used as a scanner in conjunction with an electroluminescent display.

The variable resistivity shift register described with respect to FIG. 2 can readily be used as a scanner in conjunction with an optoelectronic display panel. Such an embodiment is shown in FIG. 3 wherein the scanner comprises a plurality of shift modules $M_1$, $M_2$ ... connected in parallel in a configuration identical to that shown in the shift register of FIG. 2. In addition, however, each shift module is thermally, not electrically, coupled to a separate optoelectronic module in an optoelectronic display. Each optoelectronic module in the display comprises respectively a thermoresistive switch $T_1'$, $T_2'$... connected in series with an optoelectronic element, for example, an electroluminescent diode $ELD_1$, $ELD_2$ .... Note that each of the resistors $R_1$, $R_2$ ... is connected to a common bus bar, now shown, which is grounded. The switches $T_1'$, $T_2'$ are similarly connected to another bus bar, not shown, which is also grounded.

The operation of the shift register itself is substantially as described previously. As a pulse propagates from one shift module to the next, it activates each electroluminescent diode in the following manner. Consider the state of the scanner when current flow in $R_1$ has caused $T_1$ to switch to its low resistivity state. In the physical structure of the device $T_1'$ is disposed adjacent to $R_1$ so that heat produced by current flow in $R_1$ switches $T_1'$ (as well as $T_1$) to its low resistivity state. It is to be noted here that current flow in $R_1$ does not pass through $T_1'$. Although connected to common ground, $R_1$ and $T_1'$ are thermally, not electrically, coupled. However, upon the occurrence of the low resistivity state of $T_1'$, current flow through $ELD_1$ is increased abruptly by virtue of the fact that across the parallel combination of optoelectronic modules is impressed a modulating voltage $V_m$. The amplitude of the modulating signal controls the intensity of light emitted from each electroluminescent diode activated by the scanning pulse.

It is important that the state of each thermoresistive switch $T_1'$, $T_2'$... be controlled, not by the modulating voltage $V_m$, but rather by heat generated by the scanning pulses. This thermally coupled arrangement is advantageous in reducing faulty switching prevalent in so many prior art devices, as described previously. Although a fraction of the voltage $V_m$ may appear across a thermoresistive switch, which at a particular instant is supposed to be open, this switch will not be erroneously closed because its state is dependent upon the thermal condition of its associated shift module, not upon the modulating voltage.

The schematic configuration shown in FIG. 3 is representative of but a single linear array of a display panel. A plurality of such linear arrays can readily be interconnected to form a planar array analogous to a television screen, for instance. In such a case the last module in each linear array could be utilized as the trigger module of the next linear array so that a pulse would scan the array vertically as well as horizontally. In typical television applications it may be necessary to address 100,000 spots in say 30 msec.; that is, 0.3 $\mu$sec. per spot. Such a requirement is readily satisfied with the variable resistivity scanner as described herein which may have a thermal time constant of 0.3 $\mu$sec. or less depending upon the actual structure of the device.

INTEGRATED CIRCUIT STRUCTURE

Figure 4:
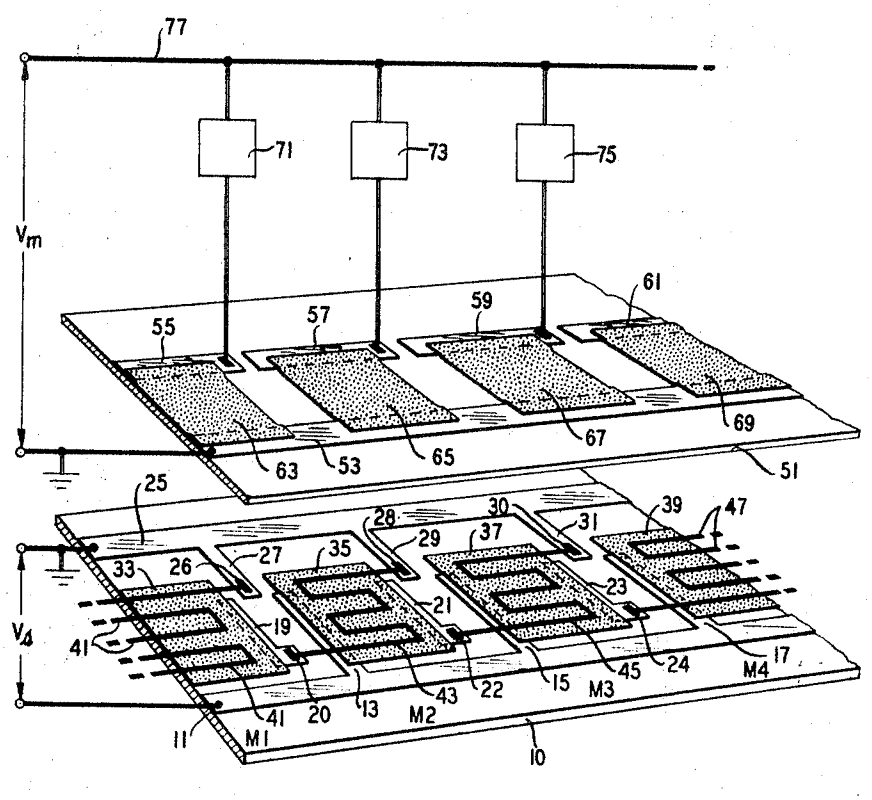
FIG. 4 shows an exploded perspective view of a part of the embodiment of FIG. 3 fabricated in thin film form.

The scanner and display panel described with respect to FIG. 3 can be fabricated in integrated circuit form as shown in FIG. 4 by well-known evaporation or sputtering techniques. The scanner comprises, as previously discussed, a plurality of shift modules $M_1$ $M_2$ ... connected in parallel. Each shift module is formed on a heat sink comprising the planar member 10. Deposited on the upper surface of the heat sink are a pair of electrically conductive bus bars 11 and 25 each having a series of spaced protruding members 13, 15 and 17, and 27, 29 and 31, respectively. In addition, L-shaped connectors 19, 21 and 23 are deposited adjacent each of the protruding members 13, 15 and 17, respectively. Next, a plurality of thermoresistive thin films 33, 35, 37 and 39, typically vanadium dioxide, are deposited on the heat sink 10 each in electrical contact with a protruding member and an L-shaped connector. For example, the thin film 35 is in contact with member 13 and connector 21.

Although not shown, a thermal insulator, typically beryllium oxide, is deposited over the entire upper surface of the heat sink 10 except of windows 20, 22 and 24, and 26, 28 and 30 which expose small areas of the bus bars for the purpose of making electrical contacts.

Heating resistors 41, 43, 45 and 47 are then deposited on the thermal insulator adjacent to and above each thermoresistive thin film. A heating resistor 43, for example, typically comprises an elongated member wound back and forth above the thermoresistive thin film 35. The resistor 43 is electrically connected in series with the thermoresistive thin film 33 of the preceding shift module $M_1$ via connector 19, and is also connected to the bus bar 25 via protruding member 28. The excitation voltage $V_s$ is connected between bus bars 11 and 25. This portion of the thin film structure constitutes the basic scanner.

Before the optoelectronic modules are fabricated, a thermal insulator 51 is deposited over the entire upper surface of the heat sink 10, covering the heating resistors. Deposited on the insulator 51, shown as a planar member in the upper half of FIG. 4, is a bus bar 53 and a plurality of spaced connectors 55, 57, 59 and 61. Thermoresistive thin film switches 63, 65, 67 and 69 are deposited in electrical contact with the bus bar 53 and with, respectively, the connectors 55, 57, 59 and 61. The thin film switches are disposed so that when the insulator 51 is made contiguous with the heat sink 10, each switch is above the adjacent to the heating resistor of its corresponding shift module. The thin film switch 65, for example, is disposed above and adjacent to the resistor 43 of shift module $M_2$.

The electroluminescent display is completed by the connection of one terminal of the optoelectronic elements 71, 73 and 75 separately to each of the connectors 55, 57 and 59, respectively. The other terminals of the optoelectronic elements are connected to bus bar 77. The modulating voltage $V_m$ is impressed across the bus bars 53 and 77. The operation of the scanner in conjunction with the display is as described with respect to FIG. 3.

In fabricating the heating resistors, it is desirable that the resistance of each satisfy approximately the following equation:

$$R_h = \sqrt{R_{on} R_{off}} \quad (1)$$

where $R_h$ is resistance of the heating resistor, and $R_{on}$ and $R_{off}$ are the resistances of each of the thermoresistive thin films 33, 35, 37 and 39 in their low and high resistivity states, respectively. Equation (*b*) indicates that $R_h$ is the geometric means of $R_{on}$ and $R_{off}$.

SHIFT REGISTER - CONTROLLED

Figure 5:
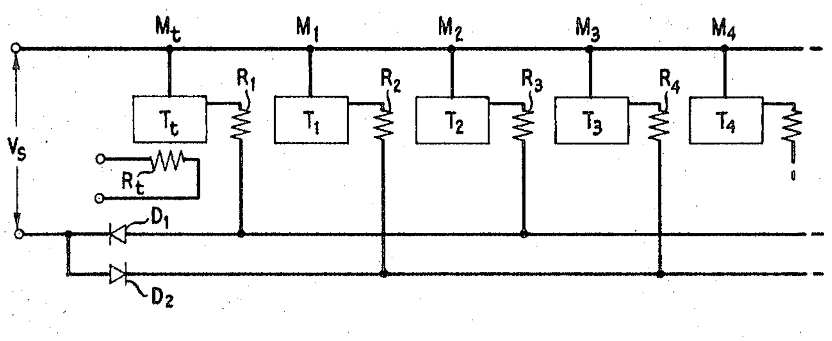
FIG. 5 is a schematic of a shift register in accordance with a second embodiment of the invention.

The shift register of FIG. 2 is a "free running" in that once a trigger pulse is applied to a shift module it propagates sequentially from one module to the next until the last module is reached, even though the initial trigger pulse in the meantime is removed. It is possible, however, to control the propagation of the pulse so that the pulse steps from one shift module to the next only at certain prescribed times. FIG. 5 shows a shift register for accomplishing this end. The basic structure of the shift modules is substantially identical to that described in FIG. 2, with two exceptions: (1) each of the heating resistors is disposed so as to heat the thermoresistive element of its associated shift module and that of the next preceding shift module, and (2) each of the shift modules is connected to a conventional diode which is in turn connected to a common node and to the excitation source $V_s$. In FIG. 5 the odd numbered shift modules are coupled through diode $D_1$ to $V_s$, whereas the even numbered shift modules are coupled through diode $D_2$, oppositely poled to $D_1$, to the same terminal of $V_s$. The excitation voltage $V_s$ in this embodiment is a train of alternate polarity pulses. The operation of the shift register can be understood by considering in the first instance that $V_s$ is a negative pulse and that $T_t$ is in its low resistivity state. Under these conditions current will flow through $R_1$ and $D_1$, the latter being forward-biased. Since $R_1$ is disposed adjacent to $T_t$ (as well as $T_1$), that module will be maintained in its low resistivity state even after the removal of the trigger pulse. However, although $T_1$ is switched to its low resistivity state by the heat produced in $R_1$, very little current will flow in $R_2$ because diode $D_2$ is reverse-biased by the negative voltage of $V_s$. Thus, the pulse present at $M_1$ cannot propagate to $M_2$. Upon the reversal of the polarity of $V_s$ to positive, however, diode $D_2$ becomes forward-biased allowing current to flow through $R_2$ which heats $T_2$ switching it to its low resistivity state. As before, $R_2$ being disposed adjacent to $T_1$, maintains $T_1$ in its low resistivity state. Again, however, current will not flow in $R_3$ because now $D_1$ is reverse-biased. In this manner it can be seen that a pulse propagates from one shift module to the next only upon each polarity reversal of the voltage $V_s$.

SCANNER FOR A COLOR DISPLAY PANEL

The several embodiments of the present invention can be employed as a scanner in a three-color display panel (analogous to color television). Again the basic scanner, as previously described with respect to FIG. 2, comprises a plurality of shift modules $M_1$, $M_2$ ... connected in parallel. In this case associated with each module is an optoelectronic module comprising three thermoresistive switches $T_R$, $T_B$ and $T_G$, all thermally coupled to a single heating resistor $R_1$ (considering for simplicity only shift module $M_1$). Connected in series with $T_R$ is an optoelectronic element which emits red light, and connected in series with $T_B$ and $T_G$ are elements which emit blue and green light, respectively. Across each series combination is impressed a separate modulating voltage to control separately the intensity of the red, blue and green light emitted.

The operation of the three-color system is analogous to that described in FIG. 3. As a pulse propagates from one shift module of the scanner to the next, it switches simultaneously $T_R$, $T_B$ and $T_G$ of the associated optoelectronic module to their low resistivity states causing an abrupt increase in current flow through the red, blue and green optoelectronic elements. Simultaneously the modulating voltages applied across each series combination control the intensity of red, blue and green light emitted.

Figure 6A:
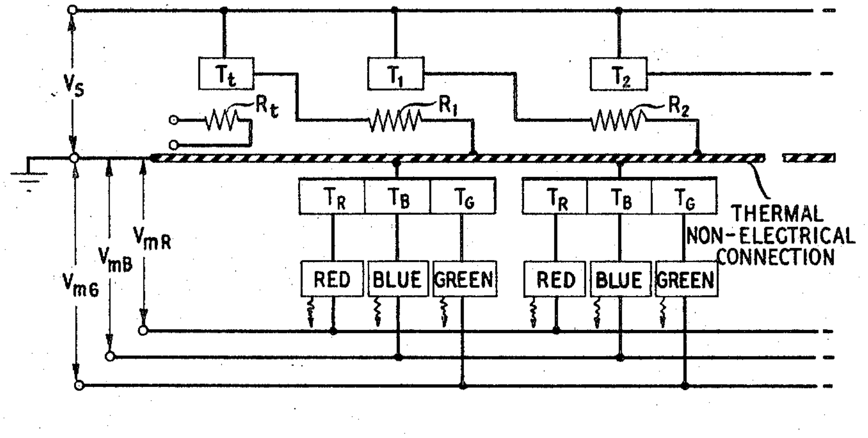
FIGS. 6A and 6B are schematics of a shift register used as a scanner in conjunction with a three-color display panel in accordance with illustrative embodiments of the invention.
Figure 6B:
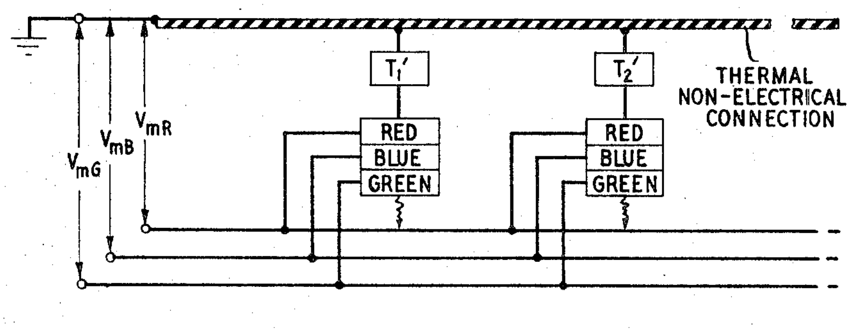

FIG. 6B shows an alternate display panel arrangement for color scanning, the scanner being identical to that shown in FIG. 6A. Instead of utilizing separate thermoresistive switches $T_R$, $T_B$ and $T_G$ for each optoelectronic module, a single switch $T_1'$ is connected to a stack of red, blue and green optoelectronic elements. Each of the elements is again connected to a separate modulating voltage to control the intensity of light it emits.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

In particular, the basic scanner described can readily be formed on a single substrate coated with a uniform film of a thermoresistive material. Each module would then be defined as a particular region of that substrate.

I claim:

1. A display device comprising in combination:

a. a plurality of shift modules connected in parallel, said shift modules each comprising:
   1. a thermoresistive first element characterized by a metal-semiconductor phase transition at a particular transition temperature;
   2. means for switching said thermoresistive first element from a high to a low resistivity state comprising resistive means for heating said first element to its transition temperature, said heating means being disposed in good heat exchange relationship with said thermoresistive first element and being electrically connected in series with the thermoresistive first element of the next preceding of said modules;

b. means for sequentially switching said shift modules comprising means for applying a heat pulse to the thermoresistive first element of one of said shift modules;

c. a plurality of optoelectronic modules connected in parallel, each of said optoelectronic modules being thermally coupled to, and electrically isolated from, a separate one of said shift modules; and d. said optoelectronic modules each comprising:
   1. a thermoresistive second element characterized by a metal-semiconductor phase transition at a particular transition temperature,
   2. an electroluminescent diode electrically connected in series with said thermoresistive second element, and and
   3. means for applying a modulating voltage across each of said electroluminescent diodes,
   4. said thermoresistive second element of said optoelectronic module being disposed in good heat exchange relationship with said heating means of its associated shift module so as to be switched to a low resistivity state, thereby to activate said electroluminescent diode in response to said modulating voltage.

2. A display device comprising in combination a. a plurality of shift modules connected in parallel, said shift modules each comprising:

a thermoresistive first element characterized by a metal-semiconductor phase transition at a particular transition temperature;

2. means for switching said thermoresistive first element from a high to a low resistivity state comprising resistive means for heating said first element to its transition temperature, said heating means being disposed in good heat exchange relationship with said thermoresistive first element and being electrically connected in series with the thermoresistive first element of the next preceding of said modules;

b. means for sequentially switching said shift modules comprising means for applying a heat pulse to the thermoresistive first element of one of said shift modules;

c. a plurality of optoelectronic modules connected in parallel, each of said optoelectronic modules being thermally coupled to, and electrically isolated from, a separate one of said shift modules;

d. said optoelectronic modules each comprising:

1. a thermoresistive second element characterized by a metal-semiconductor phase transition at a particular transition temperature;

2. a plurality of electroluminescent diodes each being responsive to modulating information impressed across thereacross to emit radiation at mutually distinct wavelengths, and being electrically connected in series with said thermoresistive second element; and 3. means for applying a separate modulating voltage across each one of said plurality of electroluminescent diodes;

4. said thermoresistive second element being disposed in good heat exchange relationship with the heating means of its associated shift module so as to be switched to a low resistivity state, thereby to activate each of said electroluminescent diodes separately in response to said separate voltages.